(12) United States Patent
Iyer et al.

(10) Patent No.: US 10,140,259 B2
(45) Date of Patent: Nov. 27, 2018

(54) METHOD AND SYSTEM FOR DYNAMICALLY GENERATING MULTIMEDIA CONTENT FILE

(71) Applicant: Wipro Limited, Bangalore (IN)

(72) Inventors: Manjunath Ramachandra Iyer, Bangalore (IN); Sawani Bade, Bangalore (IN); Jijith Nadumuri Ravi, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 246 days.

(21) Appl. No.: 15/178,639

(22) Filed: Jun. 10, 2016

(65) Prior Publication Data
US 2017/0315966 A1  Nov. 2, 2017

(30) Foreign Application Priority Data

Apr. 28, 2016 (IN) .............................. 201641014803

(51) Int. Cl.
*G06F 17/22* (2006.01)
*G06F 17/21* (2006.01)
(Continued)

(52) U.S. Cl.
CPC ............ *G06F 17/212* (2013.01); *G06F 17/28* (2013.01); *G06F 17/30038* (2013.01);
(Continued)

(58) Field of Classification Search
CPC .. G06F 17/212; G06F 17/28; G06F 17/30047; G06F 17/30256; G06F 17/30038; G11B 27/34
See application file for complete search history.

(56) References Cited

U.S. PATENT DOCUMENTS 6,148,173 A * 11/2000 Bell ...................... B42D 3/123
                                                            40/455
6,591,280 B2   7/2003 Orr
(Continued)

FOREIGN PATENT DOCUMENTS

WO    WO 2010/081225    7/2010

OTHER PUBLICATIONS

Extended European Search Report issued in the European Patent Office in counterpart European Application No. 16207207.8, dated Jul. 14, 2017, 8 pages.

*Primary Examiner* — Maikhanh Nguyen
(74) *Attorney, Agent, or Firm* — Finnegan, Henderson, Farabow, Garrett & Dunner, LLP

(57) ABSTRACT

Disclosed herein is a method and system for dynamically generating multimedia content file. The method comprises receiving, by a multimedia content generator, description of an event from a user. The method comprises identifying one or more keywords from the description of the event. Further, the method comprises mapping the one or more identified keywords with one or more images, related to one or more objects, stored in a content database for generating one or more scenes related to the description. An initial-level multimedia content file is generated by composing the one or more scenes. Furthermore the method comprises receiving one or more inputs on the initial-level multimedia content file from the user. Finally, a final-level multimedia content file is generated based on the one or more inputs received on the initial-level multimedia content file.

17 Claims, 6 Drawing Sheets

(51) Int. Cl.
*G06F 17/30* (2006.01)
*G11B 27/34* (2006.01)
*G06F 17/28* (2006.01)

(52) U.S. Cl.
CPC .. *G06F 17/30047* (2013.01); *G06F 17/30256* (2013.01); *G11B 27/34* (2013.01)

(56) References Cited

U.S. PATENT DOCUMENTS

| | | | |
|---|---|---|---|
| 6,661,418 B1* | 12/2003 | McMillan | G06T 13/205 |
| | | | 345/473 |
| 7,016,828 B1* | 3/2006 | Coyne | G06F 17/212 |
| | | | 704/9 |
| 7,027,975 B1* | 4/2006 | Pazandak | G06F 17/30684 |
| | | | 704/9 |
| 7,212,666 B2* | 5/2007 | Zhang | G06F 17/30843 |
| | | | 382/162 |
| 7,373,292 B1* | 5/2008 | Coyne | G06F 17/212 |
| | | | 704/7 |
| 7,512,537 B2* | 3/2009 | Pahud | G06T 13/00 |
| | | | 345/473 |
| 7,599,838 B2* | 10/2009 | Gong | G10L 13/00 |
| | | | 345/473 |
| 7,738,778 B2 | 6/2010 | Agnihotri et al. | |
| 7,818,329 B2* | 10/2010 | Campbell | G06F 17/30056 |
| | | | 707/755 |
| 9,020,824 B1* | 4/2015 | Govil | G10L 19/04 |
| | | | 704/270 |
| 9,846,696 B2* | 12/2017 | Arngren | G06F 17/3002 |
| 2002/0083471 A1 | 6/2002 | Agnihotri et al. | |
| 2004/0197071 A1* | 10/2004 | Zhang | G06F 17/30843 |
| | | | 386/264 |
| 2006/0217979 A1 | 9/2006 | Pahud et al. | |
| 2007/0147654 A1 | 6/2007 | Clatworthy et al. | |
| 2007/0171303 A1 | 7/2007 | Barbieri et al. | |
| 2009/0058860 A1* | 3/2009 | Fong | G06F 17/27 |
| | | | 704/9 |
| 2011/0040555 A1* | 2/2011 | Wegner | G06F 17/27 |
| | | | 704/9 |
| 2013/0226930 A1* | 8/2013 | Arngren | G06F 17/3002 |
| | | | 707/741 |
| 2014/0147095 A1 | 5/2014 | Oz et al. | |
| 2014/0160134 A1 | 6/2014 | Bekmambetov | |
| 2017/0243500 A1* | 8/2017 | Kompella | G09B 7/02 |
| 2018/0262798 A1* | 9/2018 | Ramachandra | G06F 17/30828 |

\* cited by examiner

METHOD AND SYSTEM FOR DYNAMICALLY GENERATING MULTIMEDIA CONTENT FILE

TECHNICAL FIELD

The present subject matter is related, in general to multimedia computing, and more particularly, but not exclusively to a method and system for dynamically generating multimedia content file.

BACKGROUND

Multimedia is a media type that uses a combination of different data content forms such as text, audio, images, animation, graphics, video and interactive content. Multimedia files contrast with other media types that use only rudimentary computer displays such as text-only or traditional forms of printed or hand-produced material. There are a number of fields such as business, education, journalism, research and entertainment where multimedia contents can be of help. Multimedia contents make it easier for audience to relate to what the subject is all about by showing how exactly things look like, how they move and how they change over time.

However, the process of generating the multimedia contents can be difficult since the process is technically complex. Multimedia files involve large amounts of data, and hence, require fast, powerful computers having a lot of storage capacity along with fast networks for transmitting the contents. Further, applications such as multimedia based digital storytelling can be a non trivial task since it involves understanding of the context and the intent of the story. Creating a multimedia story file often involves translating the human narrations and gestures into visualizations and formal documents. A multimedia story file is generally a combination of video clips, texts, still photos, audios, graphics and interactivity presented in a nonlinear format in which the information in each medium is complementary and not redundant.

The existing methods for generating the multimedia contents includes retrieving static and pre-stored media from a storage and then combining the retrieved media to form a single multimedia content. However, these existing methods fail to represent and express the human intentions that require hither to unknown scenes. This limits the exploration of high quality and customizable content of multimedia and thereby limiting the utility of the multimedia contents. Hence, there is a need for a technique that is capable of interactively communicating with the users for rendering the thoughts and intentions of the users in the multimedia content.

The challenges mainly faced in generating a multimedia content file include interpreting a user's description of an event and establishing an interactive communication with the user for dynamically generating the multimedia content file.

SUMMARY

Disclosed herein is a method and system for dynamically generating multimedia content file. The method includes mapping one or more keywords in the user's description of an event to one or more images stored in a database for generating an abstract scene of the event. Further, the method generates a final scene of the event based on one or more user inputs received on the abstract scene of the event.

Accordingly, the present disclosure relates to a method for dynamically generating multimedia content file. The method comprises receiving, by a multimedia content generator, description of an event from a user. The method comprises identifying one or more keywords from the description of the event. Further, the method comprises mapping the one or more identified keywords with one or more images, related to one or more objects, stored in a content database for generating one or more scenes related to the description. An initial-level multimedia content file is generated by composing the one or more scenes. Furthermore the method comprises receiving one or more inputs on the initial-level multimedia content file from the user. Finally, a final-level multimedia content file is generated based on the one or more inputs received on the initial-level multimedia content file.

Further, the present disclosure relates to a multimedia content generator for dynamically generating multimedia content file. The multimedia content generator comprises a processor and a memory communicatively coupled to the processor, wherein the memory stores processor executable instructions. The instructions, on execution, cause the processor to receive description of an event from a user. The instructions further cause the processor to identify one or more keywords from the description of the event. Upon identifying the keywords, the instructions cause the processor to map the one or more identified keywords with one or more images, related to one or more objects, stored in a content database for generating one or more scenes related to the description. Further, the instructions cause the processor to generate an initial-level multimedia content file by composing the one or more scenes. One or more inputs on the initial-level multimedia content file are received from the user. Finally, the instructions cause the processor to generate a final-level multimedia content file based on the one or more inputs received on the initial-level multimedia content file.

In another embodiment, a non-transitory computer-readable storage medium for dynamically generating multimedia content file is disclosed which when executed by a computing device, cause the computing device to perform operations comprising receiving description of an event from a user. The operations further comprising identifying one or more keywords from the description of the event. Upon identifying the keywords, the operations comprising mapping the one or more identified keywords with one or more images, related to one or more objects, stored in a content database for generating one or more scenes related to the description. Further, the operations comprising generating an initial-level multimedia content file by composing the one or more scenes. One or more inputs on the initial-level multimedia content file are received from the user. Finally, the operations comprising generating a final-level multimedia content file based on the one or more inputs received on the initial-level multimedia content file.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
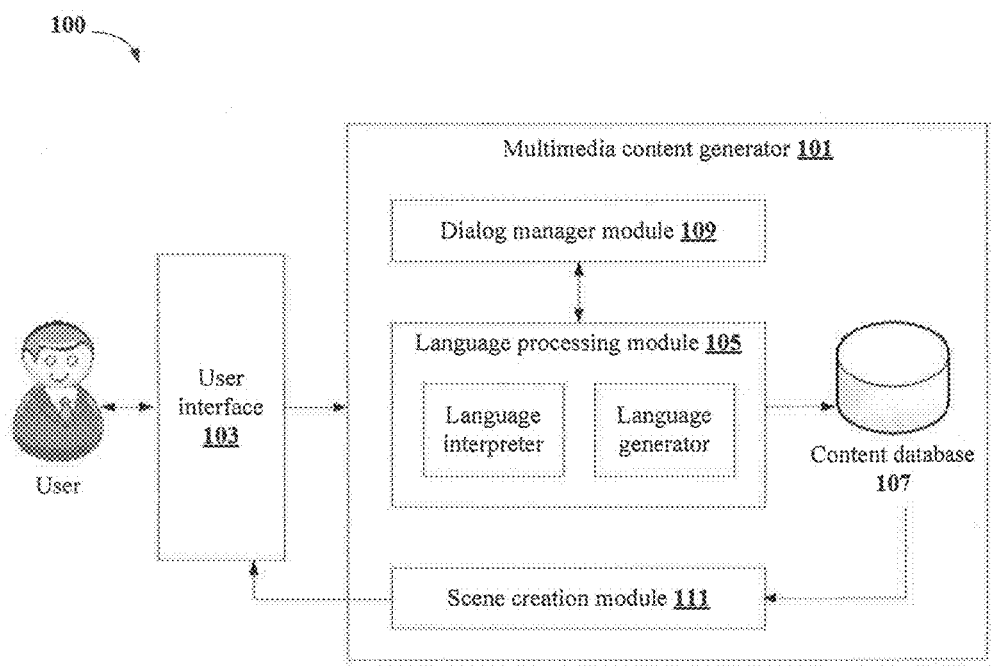
FIG. 1 shows an exemplary environment illustrating a multimedia content generator for dynamically generating multimedia content file in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for dynamically generating multimedia content file. The system identifies one or more keywords from the description of an event received from the user. As an example, the event can be a 'soccer match' and the event description received from the user may include one or more details of the soccer match including, time and venue of the match, teams participating in the match etc. Now, the system maps the one or more identified keywords with one or more images that are related to the one or more keywords and objects in the event description. The one or more images may be stored in a content database which is associated with the system. In an embodiment, the system dynamically generates one or more scenes that relate to the event description by combining the one or more images stored in the content database. The content database stores only the images related to the keywords and objects, rather than the one or more scenes that relate to the event description, thereby reducing the amount of storage space consumed by the system. Further, the system generates an initial-level multimedia content file by composing the one or more scenes related to the event description. Now, the system establishes an interaction with the user to receive one or more inputs on the generated initial-level multimedia content file. The one or more inputs received from the user enable the system to improve the correctness and completeness of the initial-level multimedia content file with respect to the event description provided by the user. Furthermore, the system generates a final-level multimedia content file by including one or more changes and/or modifications to the initial-level multimedia content file based on the one or more user inputs. In an exemplary embodiment, the system explained hereinabove may be implemented in all forms of free story conceptualization such as documentary generation, short film production, product brochure generation, advertisements designs, story illustration for children and education.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a multimedia content generator for dynamically generating multimedia content file in accordance with some embodiments of the present disclosure.

The environment 100 comprises a user and a multimedia content generator 101 for dynamically generating multimedia content file based on description of an event received from the user. The event description 127 (also referred as description of an event 127) received from the user may be of one or more forms including, text inputs, audio/video inputs, user narration and the similar. In an embodiment, the multimedia content generator 101 receives the description of the event using a user interface 103 configured in the multimedia content generator 101. As an example, the user interface 103 may be a Graphical User Interface (GUI) that accepts inputs via devices such as a computer keyboard and mouse and provides articulated graphical output on a computer monitor. Further, the user interface 103 may be of one of the various types of user interfaces including, touch user interface, gesture based user interfaces and voice based user interfaces. In an implementation, the user interface 103 may be coupled with one or more image/video capturing devices such as, a microphone, a digital camera and a web camera for capturing the user's narration of the event.

Upon receiving the description of the event from the user, the multimedia content generator 101 identifies one or more keywords 129 from the event description 127 using a language processing module 105 configured in the multimedia content generator 101. As an example, the one or more identified keywords 129 may be names of one or more things and characters involved in the event. Further, a scene creation module 111 configured in the multimedia content generator 101 maps the one or more identified keywords 129 with one or more images stored in the multimedia content generator 101 for generating one or more scenes of the event description 127. In an embodiment, the one or more images may be stored in a content database 107 configured in the multimedia content generator 101. The one or more images stored in the content database 107 may include, without limitation, images and/or graphical representations of the one or more objects and characters that generally involve in an event. In an alternative embodiment, the multimedia content generator 101 may use an online multimedia repository for fetching one or more new images when the one or more images required for mapping the one or more identified keywords 129 is unavailable in the content database 107. As an example, the online multimedia repository used by the multimedia content generator 101 may include, without limitation, Google® image search engine and Yahoo!® video search engine.

In an embodiment, the content database 107 may be stored in the memory 123 of the multimedia content generator 101. One or more attributes such as, length, width and color of the images are stored in the content database 107 and it may be dynamically changed by the multimedia content generator 101 upon receiving the one or more inputs from the user. In an embodiment, each of the plurality of images in the content database 107 may be stored in mesh polygonal model of the images for generating flexible characters that are involved in the event description 127. Storing the plurality of images in the mesh polygonal model helps in modifying one or more attributes such as, color, size, posture and shape of the plurality of images during mapping according to the event description 127 and the one or more inputs received from the user. In an embodiment, it is also possible for the user to enrich the content database 107 dynamically. For example, the user may add a cat called 'Tom'. Subsequently, when the tom is referred in the story, the cat object labeled as 'Tom' will be fetched from the content database 107. Further, the content database 107 also stores one or more background images that may be used as the background of a scene based on the context of the event description 127. e.g., the background of a scene may be outdoor, grassland, sky etc.

Further, the multimedia content generator 101 generates an initial-level multimedia content file 133 by composing the one or more scenes that are generated based on the mapping. In an embodiment, the initial-level multimedia content file 133 generated by the multimedia content generator 101 may be an abstract representation of the one or more objects and characters that are involved in the event description 127, without necessarily comprising the relationship between them. The multimedia content generator 101 may further enhance correctness of the initial-level multimedia content file 133 by receiving the one or more user inputs on the initial-level multimedia content file 133. A dialog manger module configured in the multimedia content generator 101 may be used to establish the interactivity between the user and the multimedia content generator 101. The one or more user inputs may be received by means of an interactive communication between the multimedia content generator 101 and the user via the user interface 103. In an embodiment, the multimedia content generator 101 generates more than one initial-level multimedia content files 133 when one or more changes/improvements are made to the initial-level multimedia contents based on the one or more subsequent user inputs on the one or more initial-level multimedia content files 133. Furthermore, the multimedia content generator 101 generates a final-level multimedia content file 135 upon performing one or more changes/modifications on the initial-level multimedia content file 133 based on the one or more inputs received from the user. The method of dynamically generating multimedia content file is explained briefly in the forthcoming sections of this disclosure.

Figure 2A:
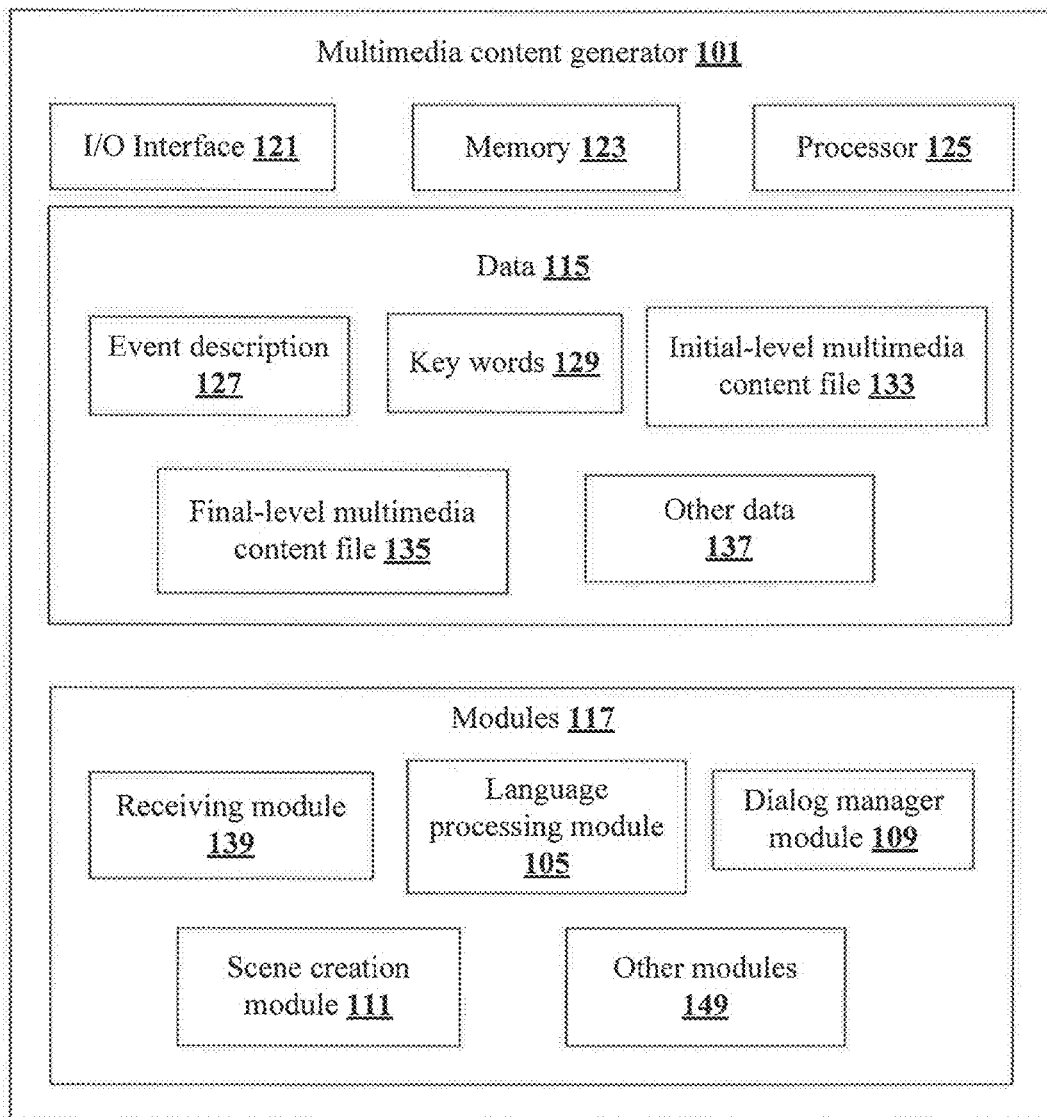
FIG. 2a shows a detailed block diagram illustrating the multimedia content generator in accordance with some embodiments of the present disclosure.

FIG. 2a shows a detailed block diagram illustrating the multimedia content generator in accordance with some embodiments of the present disclosure.

The multimedia content generator 101 comprises an I/O interface 121, a memory 123 and a processor 125. The I/O interface 121 is configured to receive the description of the event and one or more inputs from the user using the user interface 103. The memory 123 is communicatively coupled to the processor 125. The processor 125 is configured to perform one or more functions of the multimedia content generator 101 for dynamically generating multimedia content file for the event description 127. In one implementation, the multimedia content generator 101 comprises data 115 and modules 117 for performing various operations in accordance with the embodiments of the present disclosure. In an embodiment, the data 115 may include, without limiting to, the event description 127, the one or more keywords 129, the initial-level multimedia content file 133, the final-level multimedia content file 135 and other data 137.

In one embodiment, the data 115 may be stored within the memory 117 in the form of various data structures. Additionally, the aforementioned data 115 can be organized using data models, such as relational or hierarchical data models. The other data 137 may store data, including temporary data and temporary files, generated by modules 117 for performing the various functions of the multimedia content generator 101.

In an embodiment, the event description 127 is the description of an event that may be used for transmitting a mental/imaginary image of the particulars of the event into words/definitions. The description of an event 127 may comprise one or more attributes of each of the one or more objects, one or more actions performed by the one or more objects and relationship among the one or more objects involved in the event. The event description 127 is a combination of the dialogs, narrations, exposition and summarization of the event. In an embodiment, the multimedia content generator 101 receives the description of the event in one or more forms comprising at least one of narration of the event by the user, one or more textual inputs and one or more audio/video inputs. The various forms of the event description 127 that may be used by the multimedia content generator 101 for generating a multimedia content file is explained briefly in FIG. 2b.

In an embodiment, the one or more keywords 129 are identified from the event description 127 using a language processing module 105 configured in the multimedia content generator 101. The one or more keywords 129 are one or more significant words comprised in the event description 127. As an example, the one or more keywords 129 may include, without limitation, names of the one or more objects and characters involved in the event, one or more attributes that describe the one or more objects and actions and relationship among the one or more objects. In an embodiment, the one or more keywords 129 from the description of the event are identified using a language processing module 105 configured in the multimedia content generator 101.

In an embodiment, the initial-level multimedia content file 133 is an abstract multimedia content file that is generated by composing the one or more scenes of the event. The initial-level multimedia content file 133 may not necessarily illustrate the relationship among the one or more objects involved in the event. The initial-level multimedia content file 133 may lack minor details such as, the one or more attributes of the one or more objects. Also, the multimedia content generator 101 may generate more than one initial-level multimedia content files 133 based on the subsequent inputs received from the user, on the one or more previous versions/levels of the initial-level multimedia content file 133.

In an embodiment, the final-level multimedia content file 135 is the absolute multimedia content file generated by the multimedia content generator 101, which may illustrate the complete event. The final-level multimedia content file 135 is generated by modifying the initial-level multimedia content file 133 according to the one or more inputs received from the user.

In an embodiment, the data 115 may be processed by one or more modules 117 of the multimedia content generator 101. In one implementation, the one or more modules 117 may also be stored within the memory 123. In an example, the one or more modules 117 may be communicatively coupled to the processor 125 for performing one or more functions of the multimedia content generator 101. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 117 may include, without limitation, a receiving module 139, a language processing module 105, a dialog manager module 109, a scene creation module 111, a file generation module and other modules 149.

In an embodiment, the receiving module 139 may be configured to receive the event description 127 and the one or more inputs from the user through the user interface 103 configured in the multimedia content generator 101. In an embodiment, one or more non-textual forms of the event description 127 (such as audio files, video files and narrations) received by the receiving module 139 may be internally converted into a readable text data format by the multimedia content generator 101. As an example, the multimedia content generator 101 may employ one of a 'speech-to-text' conversion technique such as, Google® speech-to-text conversion technique, to dynamically convert the one or more non-textual forms of the event description 127. Similarly, the multimedia content generator 101 may also employ one or more image and/or video processing techniques for capturing actions and emotions of the user when the user is narrating the event. As an example, the user while providing the description of an event 127 may say that a 'ball' was 'big' using the hand gestures. The gap between the hands of the user is a relative parameter and is indicative of the size of the ball. Hence, the same needs to be maintained during the composition of the various scenes. In a similar way, a list of attributes of one or more objects such as, size, shape, color and mood of the user (indicated through waving of the hands or raised eyebrows to express surprise) etc. may also be associated with hand gestures.

In an embodiment, the language processing module 105 may be used to process the event description 127 for identifying the one or more keywords 129 from the event description 127. As an example, the user utterance may include a sentence such as; "a green parrot with red nose was sitting on a tree in front of a building". Here, the one or more keywords 129 that may be identified by the language processing module 105 may include the following:

Objects: A parrot, a tree and a building
Features: Green (parrot), Red (nose of the parrot)
Action: Sitting
Relationship: 'On' a tree, 'Front' of the building In an implementation, the language processing module 105 may comprise a language interpreter unit and a language generator unit (shown in FIG. 1). The language interpreter unit of the language processing module 105 may comprise a Natural Language Processing and Understanding (NLP/U) for extracting and processing the utterance of the user in the event description 127 into various parts-of-speech. Further, the language interpreter links the identified parts-of-speech with the current context and one or more previous utterances of the user. The language generator unit of the language processing module 105 may be used for providing one or more audio response to the user utterances. As an example, the audio responses may be provided in order to establish a conversation/interactivity between the user and the multimedia content generator 101. The language generator unit prompts the user to compare the one or more initial-level multimedia content files 133 and describe what is missing from the user perspective/thinking. The language generator unit is essential for generating the final-level multimedia content file 135.

In an embodiment, the dialog manager module 109 is responsible for deciding the subsequent function to be performed by the multimedia content generator 101 upon receiving the one or more inputs from the user. As an example, it may be a certain data fetch operation followed by an action performed on one of the initial-level multimedia content file 133. Additionally, the dialog manager module 109 is also responsible for establishing the interactivity among the user and the multimedia content generator 101. The dialog manager module 109 may use the language generator unit of the language processing module 105 to frame a question/comment that has to be conveyed to the user for improving the correctness of one of the initial-level multimedia content file 133. The framed question/comment is displayed to the user through the user interface 103. Further, the one or more user inputs/replies to the question/comment displayed on the user interface 103 are processed by the language interpreter unit of the language processing module 105. The dialog manager module 109 may repeat the above process until the final-level multimedia content file 135 is generated. As an example, when the user is providing the description of the event for the first time, the user may provide a very few details of a cat that has been involved in an event. Here, the dialog manager module 109 may prompt the user to reveal few more details of the cat for an effective rendering of the cat in the final-level multimedia content file 135.

The scene creation module 111 may be used for generating the initial-level multimedia content file 133 and the final-level multimedia content file 135 by mapping the one or more keywords 129 in the event description 127 with plurality of images stored in the content database 107. In an embodiment, the scene creation module 111 may create one or more scenes of the event before generating the initial-level multimedia content file 133. The one or more scenes are created based on the preprocessed parts-of-speech words and by extracting the one or more objects involved in the event, their features, actions and relationship.

The scene creation module 111 performs incremental modifications to the initial-level multimedia content file 133 based on the changes suggested by the user. The scene creation module 111 also relates one or more scenes of the event to form a single scene. As an example, a scene to depict continued motion of an object is a combination of various scenes that indicate various positions of the moving object.

In an embodiment, the scene creation module 111 links various parts of the event description 127 in order to generate a complete scene of the event. As an example, consider the description of an event 127, which may be described using the following sentences by the user.

$1^{st}$ sentence: Cat was moving straight.
$2^{nd}$ sentence: The Cat finds a lake on the right side.
$3^{rd}$ sentence: The Cat takes a left turn.

In the above scenario, the scene creation module 111 links each of the three sentences to form a complete and meaningful scene of the event. On the other hand, the scene creation module 111 may not be able to generate a meaningful scene of the event by considering any of the three sentences independently.

Figure 2B:
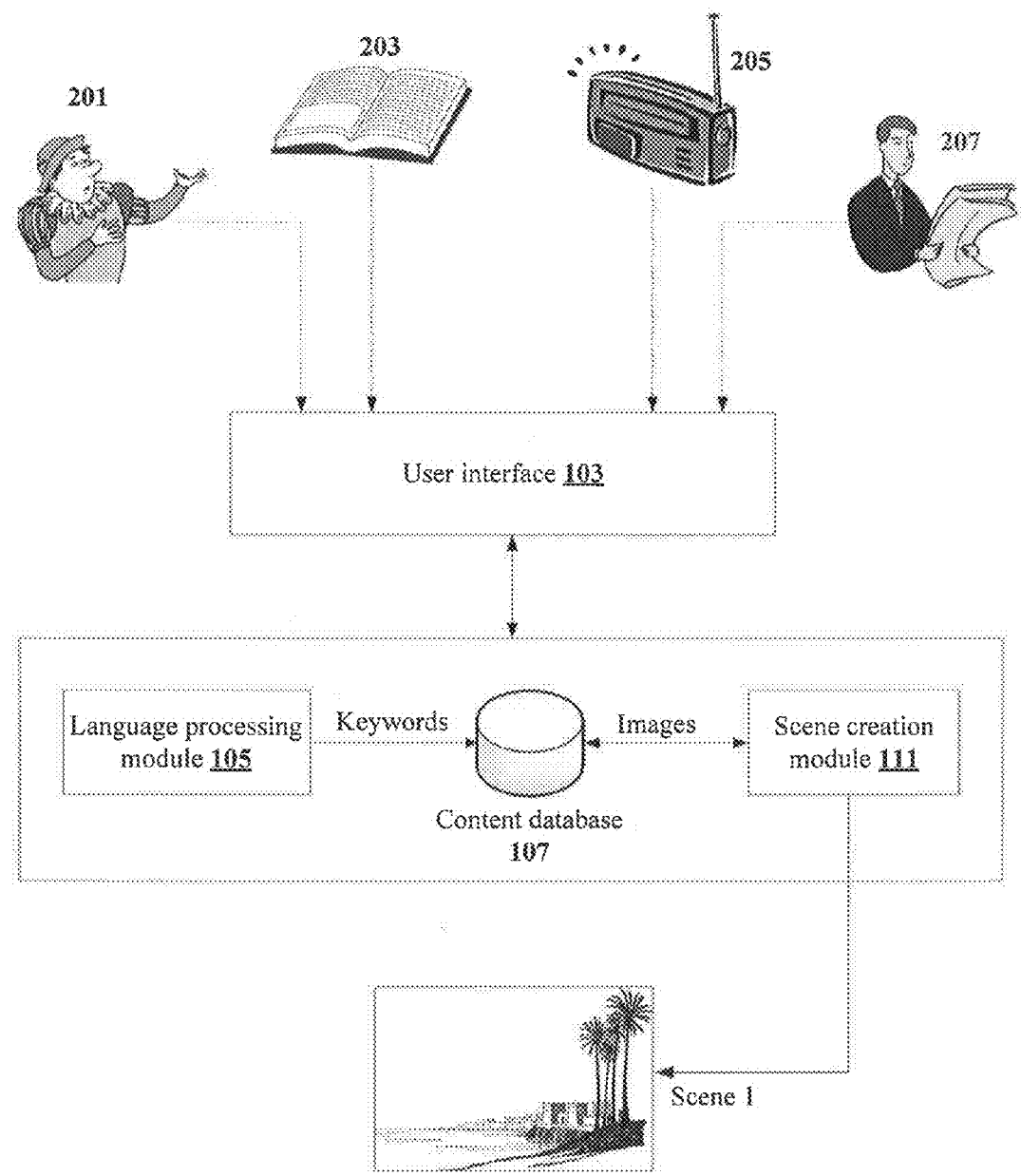
FIG. 2b shows various exemplary ways of receiving an event description for dynamically generating the multimedia content file in accordance with few embodiments of the present disclosure.

FIG. 2b illustrates a method of dynamically generating multimedia content file based on various forms of event description received from a user in accordance with few embodiments of the present disclosure.

In an embodiment, the description of the event is received in one or more forms comprising at least one of narration of the event by the user, one or more textual inputs and one or more audio inputs (indicated as scenarios 201 to 207) respectively. At scenario 201 shows a user providing the event description 127 in the form of narration. In an example, the user may narrate the event using hand gestures, varying the facial expressions and by means of actions and movements. Here, the one or more image/video capturing devices coupled with the user interface 103 of the multimedia content generator 101 captures the narration of the event. The captured images/videos are then processed by the receiving module 139 for converting the captured images/videos into one of the textual file formats. Further, the language interpreter unit of the language processing module 105 identifies one or more keywords 129 in the textual file format of the narration.

At scenario 203, the event description 127 is provided by means of various textual inputs. As an example, various types of textual inputs provided to the multimedia content generator 101 may include, without limitation, story books, novels, newspapers and other types of hard (printed) copies of the text files. In an implementation, the user interface 103 of the multimedia content generator 101 may be further coupled with an image scanning device for scanning the various types of the textual files. Here, the language interpreter unit of the language processing module 105 uses a suitable language processing technique to process and extract one or more keywords 129 from the scanned copies of the textual input files.

At scenario 205, the description of an event 127 is provided in the form of an audio input file. As an example, an audio player such as, a tape recorder or an MP3 player may be used to provide the recorded description of the event. Here, an audio recording device, such as the microphone, coupled with the user interface 103 of the multimedia content generator 101 captures the audio description of the event played by the audio recorder. The captured audio is then processed by the receiving module 139 for converting the captured audio description into one of the textual file formats. Further, the language interpreter unit of the language processing module 105 identifies one or more keywords 129 in the textual file format of the audio description.

At scenario 207, the description of an event 127 is provided in the form of an audio/sound, as the user may read out the event description 127 from a readable media. As an example, the user may read out a story, which has to be represented by a multimedia content file, from a story book. Here, the audio recording device, such as the microphone, coupled with the user interface 103 of the multimedia content generator 101 captures the oral description of the event. The captured oral description is then processed by the receiving module 139 for converting the captured oral description into one of the textual file formats. Further, the language interpreter unit of the language processing module 105 identifies one or more keywords 129 in the textual file format of the audio description.

In an embodiment, in each of the four scenarios (201-207), upon identifying the one or more keywords 129 from the event description 127, the scene creation module 111 maps the one or more identified keywords 129 with one or more images stored in the content database 107.

Further, the scene creation module 111 composes each of the mapped images to generate an initial-level multimedia content file 133 of the event description 127 indicated as Scene 1 in FIG. 2b.

Figure 2C:
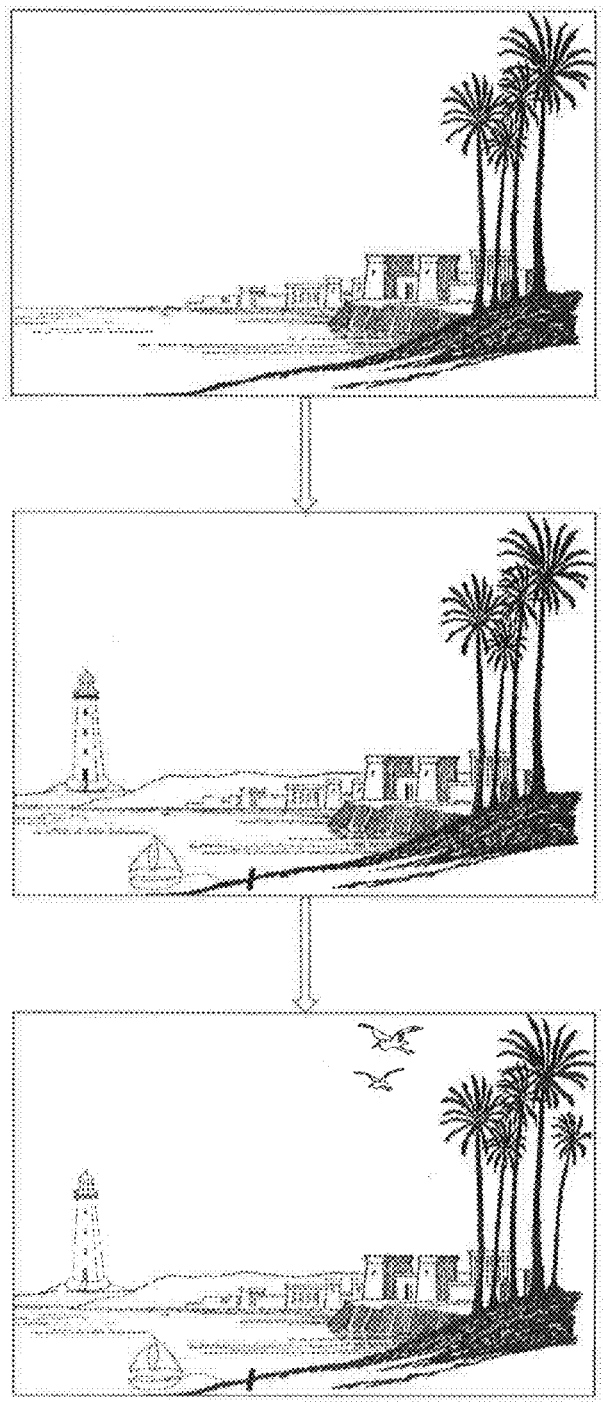
FIG. 2c illustrates the method of dynamically generating multimedia content file using interactivity between the user and the multimedia content generator in accordance with some embodiments of the present disclosure.

FIG. 2c illustrates the method of dynamically generating the final-level multimedia content file 135 by establishing the interactivity between the user and the multimedia content generator 101 system. In an embodiment, the initial-level multimedia content file 133 generated by the scene creation module 111 may be further modified to obtain the final-level multimedia content file 135 of the event description 127 based on the one or more user inputs received on the initial-level multimedia content file 133. As an example, the user may narrate an event as following:

User: "There was a vast beach having palm trees to its right. There were a few short buildings on the sideways of the beach, near the palm trees."

Upon receiving the above event description, the language interpreter unit of the language processing module 105 processes the received event description 127 and extracts one or more keywords 129 such as:

Objects: Beach, Palm trees, Building
Attributes: Vast, Short
Relationship: 'to its right', 'on the sideways', 'near'

Now, after identifying the one or more keywords 129 from the event description 127, the scene creation module 111 maps the identified one or more keywords 129 with images of the one or more keywords 129 (objects with specific attributes and relationship) in the content database 107. As an example, in the above case, the scene creation module 111 may map the keyword 'Beach' with the image of a beach. Similarly, each of the one or more identified keywords 129 is mapped into the respective images in the content database 107 before generating the initial-level multimedia content file 133. Further, the scene creation module 111 combines each of the mapped images to generate the initial-level multimedia content file 133 indicated as Scene 1 in FIG. 2c.

In an embodiment, the language generator unit of the language processing module 105 frames one or more questions/comments that need to be conveyed to the user for generating the final-level multimedia content file 135. Further, the dialog manger module provides the one or more questions/comments framed by the language generator unit on the user interface 103 for receiving one or more user inputs on the initial-level multimedia content file 133. As an example, the user may provide following comments on the initial-level multimedia content file 133:

Multimedia content generator: "Is this the correct scene?"
User: "No! There are few more things to be shown"
Multimedia content generator: "What are they?"
User: "There was a tall light house on the farther side of the beach. There was also a mini boat which was tied to the shore of the beach."

Upon receiving the above comments, the one or more keywords 129 extracted by the language interpreter unit of the language processing module 105 may be:
Objects: Light house, Boat
Attributes: Tall, Mini
Relationship: 'farther side', 'tied to'

Again, the scene creation module 111 generates a second version of the initial-level multimedia content file 133 as shown in Scene 2 upon receiving the one or more inputs on the first version initial-level multimedia content file 133 (Scene 1) using the method explained earlier. Here, the scene creation module 111 performs one or more modifications on the first version of the initial-level multimedia content file 133 to reflect the one or more inputs received from the user.

In the next step, the user may further provide one or more inputs on the second initial-level multimedia content file 133 if further modifications are necessary. As an example, the user may provide following comments on the second initial-level multimedia content file 133:

Multimedia content generator: "Is this the correct scene?"
User: "It's almost correct. Just a few changes"
Multimedia content generator: "What else was there in the scene?"
User: "There were four palm trees in total. And few birds were flying over the beach. near the palm trees."

Upon receiving the above comments, the one or more keywords 129 extracted by the language interpreter unit of the language processing module 105 may be:
Objects: Palm trees, Birds, Beach
Attributes: Four, Few
Actions: Flying
Relationship: 'over', 'near'

Now, the scene creation module 111 generates a next version of the initial-level multimedia content file 133 (Scene 3) upon receiving the one or more inputs on the second version of the initial-level multimedia content file 133 as shown in Scene 2 using the method explained earlier. Here, the scene creation module 111 performs one or more modifications on the second version of the initial-level multimedia content file 133 to reflect the one or more inputs received from the user. The modified version of the initial-level multimedia content file 133 is then displayed to the user to receive the user's comments/inputs on the modified version of the initial-level multimedia content file 133. The interaction between the user and the multimedia content generator 101 may be as following:

Multimedia content generator: "Is this the correct scene?"
User: "Yes!! This is the scene 1 had in my mind"
Multimedia content generator: "Any changes required?"
User: "No, this is great!"

Now, the multimedia content generator 101 identifies that the second version of initial-level the multimedia content file is accepted by the user. Hence, the multimedia content generator 101 treats the second version of the initial-level multimedia content file 133 as the final-level multimedia content file 135 (Scene 3). Hence, the user is provided with a multimedia content file that is accepted by the user.

Figure 3:
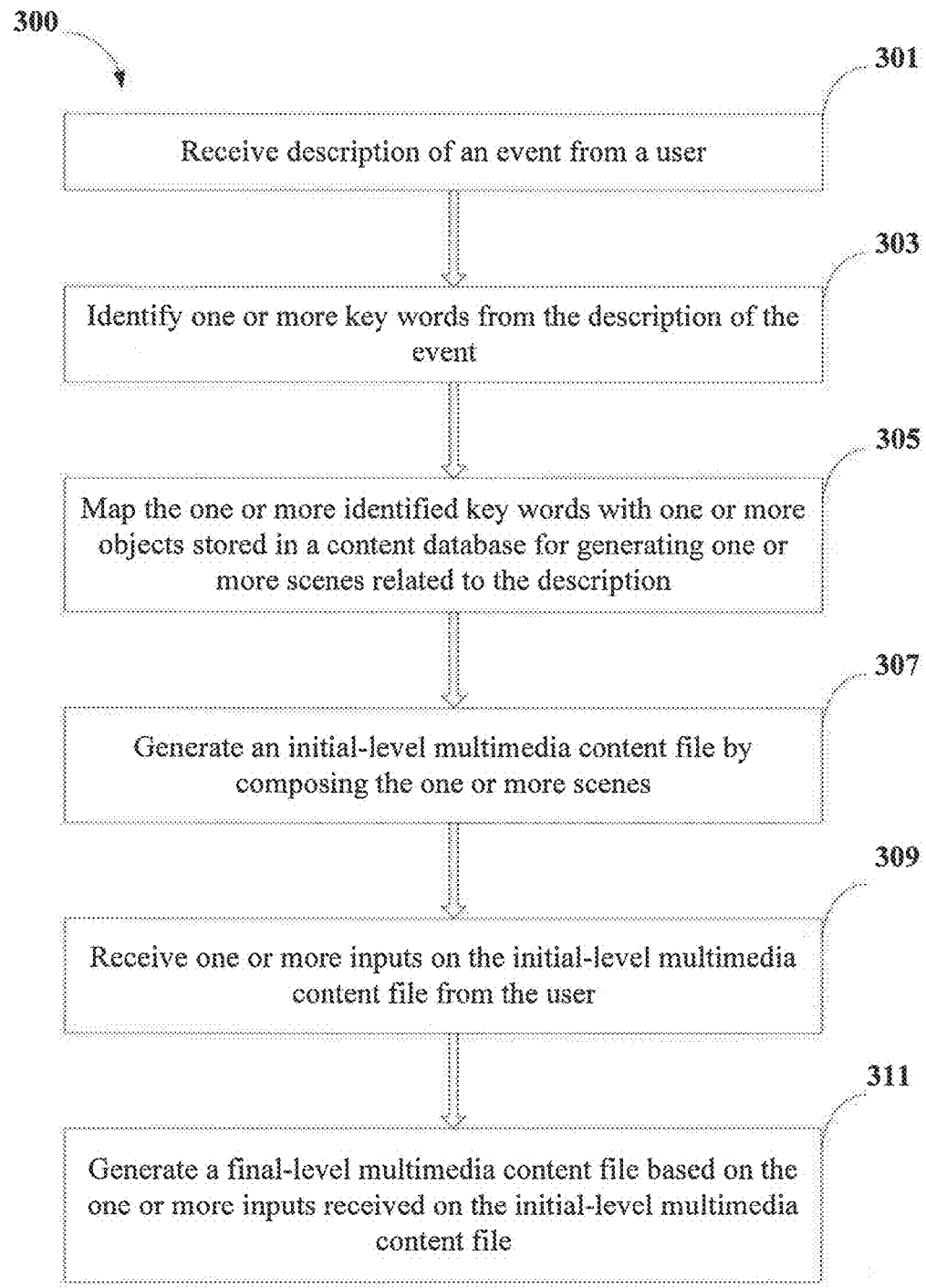
FIG. 3 shows a flowchart illustrating a method for dynamically generating a multimedia content file in accordance with some embodiments of the present disclosure.

FIG. 3 illustrates a flowchart showing method for recommending one or more events based on mood of a person in accordance with some embodiments of the present disclosure.

As illustrated in FIG. 3, the method 300 comprises one or more blocks for dynamically generating multimedia content file using a multimedia content generator 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, a multimedia content generator 101 receives description of an event 127 from a user. The description of the event is received in one or more forms comprising at least one of narration of the event by the user, one or more textual inputs and one or more audio inputs.

At block 303, the multimedia content generator 101 identifies one or more keywords 129 from the description of the event. The one or more keywords 129 from the description of the event may be identified using a Natural Language Processing (NLP) technique configured in the multimedia content generator 101.

At block 305, the multimedia content generator 101 maps the one or more identified keywords 129 with one or more images, related to one or more objects, stored in a content database 107 for generating one or more scenes related to the description. Each of the one or more images stored in the content database 107 are associated with one or more variable attributes. The one or more variable attributes of each of the one or more images includes at least one of dimensions of the image, color of the object and shape and viewpoint of the object. In an embodiment, one or more new images are fetched from an online multimedia repository when the one or more images required for mapping the one or more identified keywords 129 is unavailable in the content database 107.

At block 307, the multimedia content generator 101 generates an initial-level multimedia content file 133 by composing the one or more scenes. The one or more scenes are generated by composing the one or more images of the one or more objects/keywords 129 that are stored in the content database 107. In an embodiment, one or more new images that are fetched from an online multimedia repository may be used along with the one or more images in the content database 107 for generating the initial-level multimedia content file 133.

At block 309, the multimedia content generator 101 receives one or more inputs on the initial-level multimedia content file 133 from the user. The one or more inputs are used for performing at least one of changing the one or more objects in the one or more scenes, modifying the one or more variable attributes of the one or more images in the one or more scenes and modifying relationship between the one or more objects in the one or more scenes.

At block 311, the multimedia content generator 101 generates a final-level multimedia content file 135 based on the one or more inputs received on the initial-level multimedia content file 133.

Computer System

Figure 4:
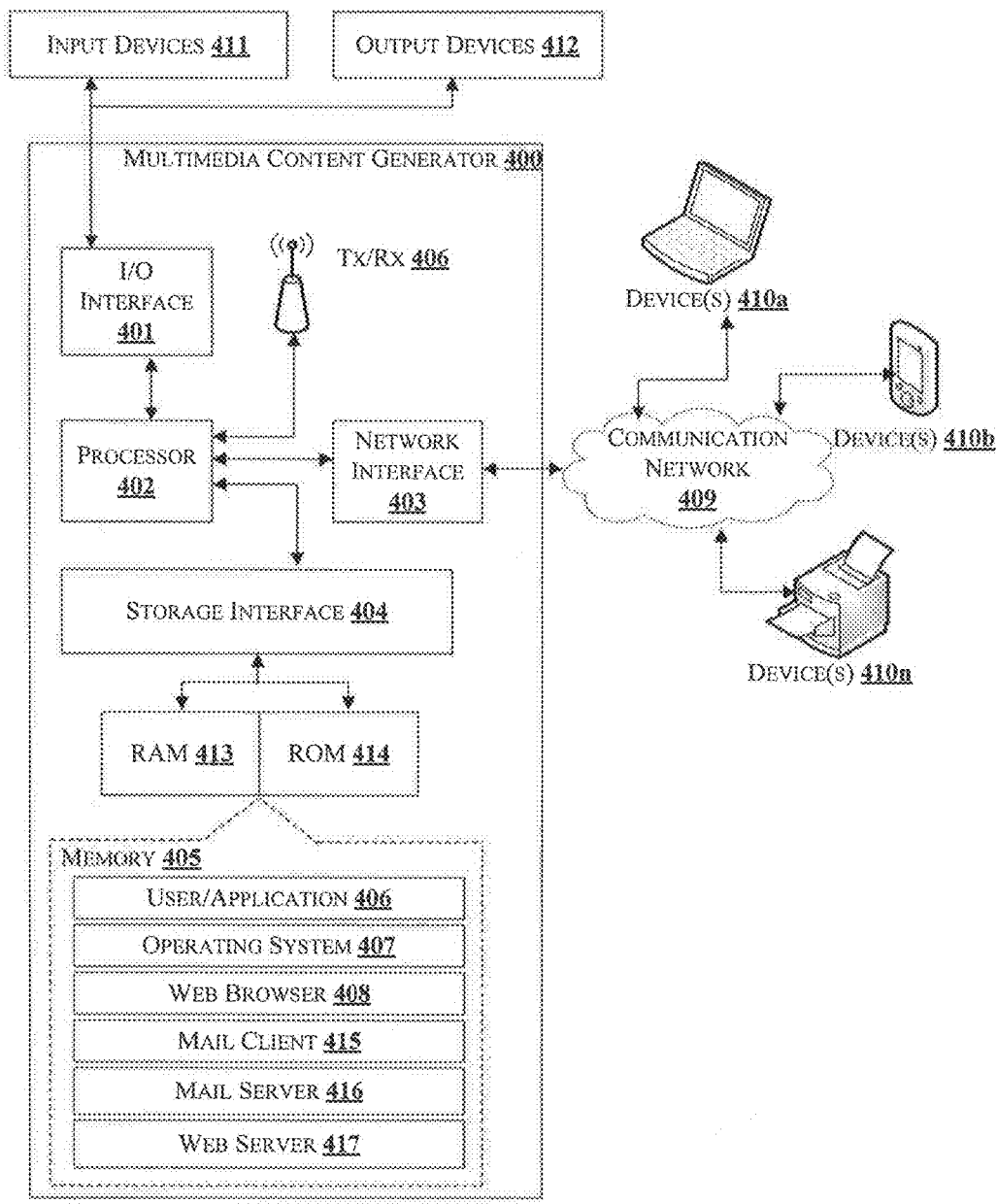
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 may be the multimedia content generator 101 which is used for dynamically generating multimedia content file. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (*a*, . . . , *n*). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (*a*, . . . , *n*) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive. Redundant Array of Independent Discs (RAID), solid-state memory devices, solid-state drives, etc.

The memory 405 may store a collection of program or database components, including, without limitation, user/application data 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript. AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method for dynamically generating a multimedia content file for representing an event based on a user's description of the event.

In an embodiment, the present disclosure provides a method for real-time and adaptive refinement of a scene of the event based on one or more user inputs on the one or more previous versions of the scene.

In an embodiment, the method of present disclosure is capable of generating a multimedia content file by fetching one or more images from an online multimedia repository when the one or more images related to the event description are unavailable in the content database.

In an embodiment, the method of present disclosure stores one or more images required for generating the multimedia content file rather than the complete scenes, thereby minimizing the storage resource/space required.

In an embodiment, the present disclosure provides a method for automatically generating a first-cut documentary of an event without the need of human intervention.

In an embodiment, the method of present disclosure provides an effective mode of narrating the stories, educating the children, producing short movies, generating advertisement designs and online troubleshooting of an event.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Multimedia content generator |
| 103 | User interface |
| 105 | Language processing module |
| 107 | Content database |
| 109 | Dialog manager module |
| 111 | Scene creation module |
| 115 | Data |
| 117 | Modules |
| 121 | I/O interface |
| 123 | Memory |
| 125 | Processor |
| 127 | Event description |
| 129 | Keywords |
| 133 | Initial-level multimedia content file |
| 135 | Final-level multimedia content file |
| 137 | Other data |
| 139 | Receiving module |
| 149 | Other modules |

What is claimed is:

1. A method for dynamically generating multimedia content file, the method comprising:
   receiving, by a multimedia content generator, description of an event from a user based on an application of one or more image processing techniques and/or video processing techniques, wherein the description comprises one or more actions and emotions of the user corresponding to the event, and one or more attributes of one or more objects associated with the event;
   identifying, by the multimedia content generator, one or more keywords from the description of the event;
   mapping, by the multimedia content generator, the one or more identified keywords with one or more images, related to one or more objects, stored in a content database for generating one or more scenes related to the description;

generating, by the multimedia content generator, an initial-level multimedia content file by composing the one or more scenes;

receiving, by the multimedia content generator, one or more inputs on the initial-level multimedia content file from the user;

generating, by the multimedia content generator, a final-level multimedia content file based on the one or more inputs received on the initial-level multimedia content file; and fetching, by the multimedia content generator, one or more new images from an online multimedia repository when the one or more images required for mapping the one or more identified keywords is unavailable in the content database.

2. The method as claimed in claim 1, wherein the description of the event is received in one or more forms comprising at least one of narration of the event by the user, one or more textual inputs and one or more audio inputs.

3. The method as claimed in claim 1, wherein the one or more keywords from the description of the event are identified using a Natural Language Processing (NLP) technique configured in the multimedia content generator.

4. The method as claimed in claim 1, wherein each of the one or more images stored in the content database are associated with one or more variable attributes.

5. The method as claimed in claim 4, wherein the one or more variable attributes of each of the one or more images includes at least one of dimensions of the image, color of the object and shape and viewpoint of the object.

6. The method as claimed in claim 1, wherein the one or more inputs are used for performing at least one of changing the one or more objects in the one or more scenes, modifying the one or more variable attributes of the one or more images in the one or more scenes and modifying relationship between the one or more objects in the one or more scenes.

7. A multimedia content generator for dynamically generating multimedia content file, the multimedia content generator comprising:
   a processor; and
   a memory communicatively coupled to the processor, wherein the memory stores processor-executable instructions, which, on execution, causes the processor to:
   receive description of an event from a user based on an application of one or more image processing techniques and/or video processing techniques, wherein the description comprises one or more actions and emotions of the user corresponding to the event, and one or more attributes of one or more objects associated with the event;
   identify one or more keywords from the description of the event;
   map the one or more identified keywords with one or more images, related to one or more objects, stored in a content database for generating one or more scenes related to the description;
   generate an initial-level multimedia content file by composing the one or more scenes;
   receive one or more inputs on the initial-level multimedia content file from the user;
   generate a final-level multimedia content file based on the one or more inputs received on the initial-level multimedia content file; and
   fetch one or more new images from an online multimedia repository when the one or more images required for mapping the one or more identified keywords is unavailable in the content database.

8. The multimedia content generator as claimed in claim 7, wherein the instructions causes the processor to receive description of the event in one or more forms comprising at least one of narration of the event by the user, one or more textual inputs and one or more audio inputs.

9. The multimedia content generator as claimed in claim 7, wherein the instructions causes the processor to identify the one or more keywords from the description of the event using a Natural Language Processing (NIP) technique configured in the multimedia content generator.

10. The multimedia content generator as claimed in claim 7, wherein each of the one or more images stored in the content database are associated with one or more variable attributes.

11. The multimedia content generator as claimed in claim 10, wherein the one or more variable attributes of each of the one or more images includes at least one of dimensions of the image, color of the object and shape and viewpoint of the object.

12. The multimedia content generator as claimed in claim 7, wherein the instructions further causes the processor to perform at least one of changing the one or more objects in the one or more scenes, modify the one or more variable attributes of the one or more images in the one or more scenes and modify relationship between the one or more objects in the one or more scenes using the one or more inputs received from the user.

13. A non-transitory computer-readable medium storing instructions for dynamically generating multimedia content file, wherein upon execution of the instructions by one or more processors, the processors perform operations comprising:
   receiving description of an event from a user based on an application of one or more image processing techniques and/or video processing techniques, wherein the description comprises one or more actions and emotions of the user corresponding to the event, and one or more attributes of one or more objects associated with the event;
   identifying one or more keywords from the description of the event;
   mapping the one or more identified keywords with one or more images, related to one or more objects, stored in a content database for generating one or more scenes related to the description;
   generating an initial-level multimedia content file by composing the one or more scenes;
   receiving one or more inputs on the initial-level multimedia content file from the user;
   generating a final-level multimedia content file based on the one or more inputs received on the initial-level multimedia content file; and
   fetching one or more new images from an online multimedia repository when the one or more images required for mapping the one or more identified keywords is unavailable in the content database.

14. The medium of claim 13, wherein the instructions causes the processor to receive description of the event in one or more forms comprising at least one of narration of the event by the user, one or more textual inputs and one or more audio inputs.

15. The medium of claim 13, wherein the instructions causes the processor to identify the one or more keywords from the description of the event using a Natural Language Processing (NLP) technique configured in the multimedia content generator.

16. The medium of claim 13, wherein each of the one or more images stored in the content database are associated with one or more variable attributes, and further wherein the one or more variable attributes of each of the one or more images includes at least one of dimensions of the image, color of the object and shape and viewpoint of the object.

17. The medium of claim 13, wherein the instructions further causes the processor to perform at least one of changing the one or more objects in the one or more scenes, modify the one or more variable attributes of the one or more images in the one or more scenes and modify relationship between the one or more objects in the one or more scenes using the one or more inputs received from the user.

* * * * *